(12) United States Patent
Harris (10) Patent No.: US 7,050,411 B2
(45) Date of Patent: May 23, 2006

(54) DYNAMIC DCCH/FCH SWITCHING

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 958 days.

(21) Appl. No.: 09/912,995

(22) Filed: Jul. 25, 2001

(65) Prior Publication Data

US 2003/0021255 A1    Jan. 30, 2003

(51) Int. Cl.
*H04B 7/216* (2006.01)
(52) U.S. Cl. ........................................ 370/335; 370/441
(58) Field of Classification Search ................ 370/320, 370/335, 441
See application file for complete search history.

(56) References Cited

U.S. PATENT DOCUMENTS

| | | | |
|---|---|---|---|
| 6,728,551 B1* | 4/2004 | Chang | 455/522 |
| 6,757,270 B1* | 6/2004 | Kumar et al. | 370/342 |
| 6,760,303 B1* | 7/2004 | Brouwer | 370/229 |
| 6,850,506 B1* | 2/2005 | Holtzman et al. | 370/335 |
| 6,850,509 B1* | 2/2005 | Lee et al. | 370/336 |
| 2001/0024431 A1* | 9/2001 | Koo et al. | 370/335 |
| 2002/0012326 A1* | 1/2002 | Chang | 370/318 |

FOREIGN PATENT DOCUMENTS

| | | |
|---|---|---|
| EP | 1 063 863 A2 | 12/2000 |
| WO | WO 99/22478 A1 | 5/1999 |
| WO | WO 99/52307 A1 | 10/1999 |
| WO | WO 99/66748 A1 | 12/1999 |
| WO | WO 01/37587 A2 | 5/2001 |
| WO | WO 01/43485 A1 | 6/2001 |
| WO | WO 01/52467 A1 | 7/2001 |
| WO | WO 01/58054 A1 | 8/2001 |

OTHER PUBLICATIONS

Knisely, Douglas N. et al., "CDMA2000: A Third-Generation Radio Transmission Technology", Bell Labs Technical Journal, Jul.-Sep. 1998, XP000782374, pp. 63-78.

* cited by examiner

*Primary Examiner*—Min Jung
(74) *Attorney, Agent, or Firm*—Kevin D. Wills (57) ABSTRACT

In a code division multiple access (CDMA) system a dispatch call is established between two mobile units (10) and (12). The system includes a CDMA 2000 system providing for the dispatch data services. This requires that messages and bearer traffic are processed by radio link protocol. The CDMA 2000 system supports the FCH and DCCH channels. If the speaker's forward link is link limited, (26), then a DCCH channel is assigned to the speaker, (28). If the speaker's reverse link is link limited then a FCH channel is assigned to the speaker. In addition if there is a low battery level of the speaker, an FCH channel is assigned to the speaker, (30). When the speaker changes, (40), the FCH and DCCH channels for the speaker and listener are switched dynamically, (44–48).

12 Claims, 8 Drawing Sheets

DYNAMIC DCCH/FCH SWITCHING

BACKGROUND OF THE INVENTION

The present invention pertains to providing data services and more particularly to providing data, voice and dispatch services over code division multiple access 2000 (CDMA 2000) system.

Providing data services over CDMA 2000 requires that the voice bearer traffic be transmitted through radio link protocol (RLP). Radio link protocol provides for two types of channels, a FCH channel which is the only type of channel for providing voice services and a DCCH channel.

For the DCCH, full frames of data must be transmitted. That is, if less than a full frame of bits are to be transmitted, then the frame must filled (padded) with unneeded bits in order to send a full frame. For the DCCH channel, when there is no data to send, only power control information is sent at approximately 800 bits per second.

For the FCH, full, half, eighth (& possibly quarter) rate frames of data may be transmitted. That is, the frame rate is generally the lowest rate frame which is large enough to carry the payload. The rest of the frame is then filled (padded) with unneeded bits in order to send the frame rate selected. For the FCH channel, when there is no data to send, power control information and an eighth rate frame is sent. Thus, when the FCH has no bearer data to send, it sends more power (generates more interference and drains more battery if a MS is sending it) than a DCCH would. If no bearer data is to be sent, then a FCH channel requires about ⅛ the power of a full frame rate frame plus the power required to send the power control information. In contrast, the DCCH only needs to send the power required to send the power control information when there is no bearer traffic to send.

In many systems, the RF link from the system to the mobile user (forward link) become RF interference limited when the system link is loaded with symmetric traffic. Typically, about eighty percent (80%) of the bits sent in a data call are sent on the forward link. This tends to also result a forward link interference limited system. As a result the forward link tends to become interference limited. Since data traffic is a growing percentage of the total traffic in modern systems, the forward link is expected to continue to be the limiting link in the typical system. However, it is possible, that in some systems, the reverse (mobile to base station link) can become the limiting link.

Accordingly, it is highly desirable to provide a data transmission, voice and dispatch services over CDMA 2000 while adding a minimum of interference to the interference limited links; regardless of the type of service provided.

DETAILED DESCRIPTION OF THE PREFERRED EMBODIMENTS

Figure 1:
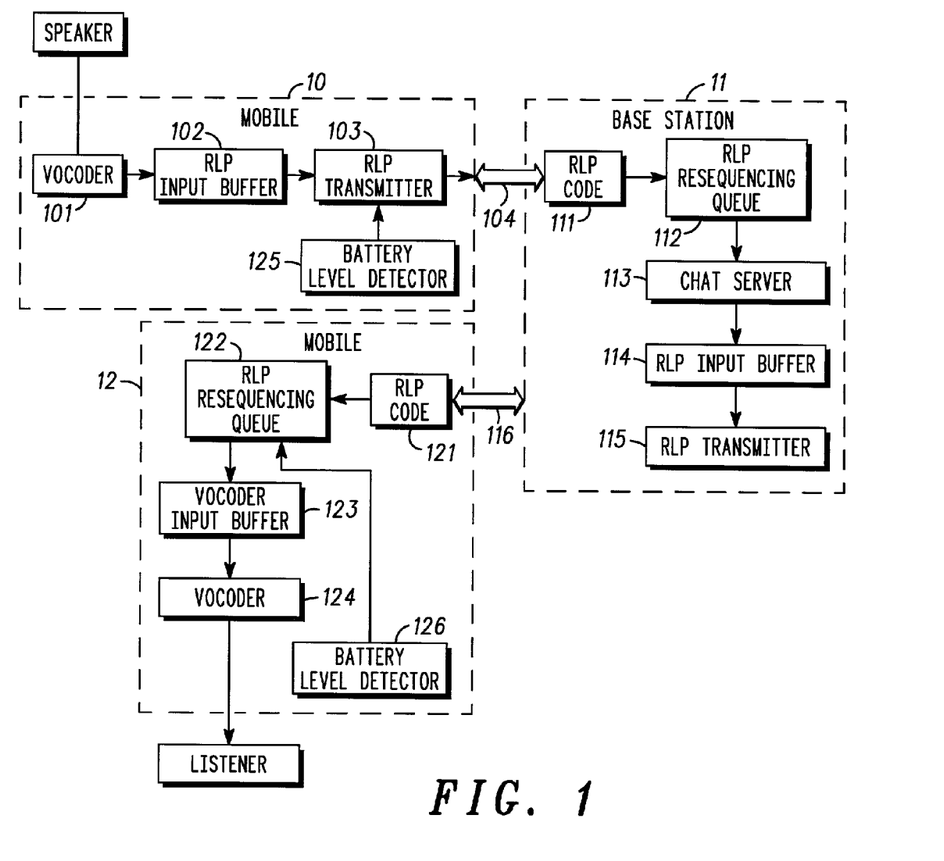
FIG. 1 is a block diagram of a mobile to mobile dispatch call via CDMA 2000 infrastructure.

FIG. 1 is a block diagram of a mobile to mobile dispatch call using CDMA 2000 standards. Mobile transceiver 10 connects through base station 11 to mobile transceiver 12. Between mobile 10 and base station 11, a speaker air link 104 provides for the data transmission from the mobile 10 to the base station 11. Base station 11 is coupled to mobile 12 via the listener's over the air link 116. The speaker at mobile 10 is coupled to vocoder 101 which transmits the voice to RLP input buffer 102. Buffer 102 feeds the RLP transmitter 103 which transmits the data over the speaker air link 104 to base station 11. The speaker may be a conventional voice speaker or may include a constant bit rate audio or video source.

At base station 11, the RLP code 111 receives the incoming data and transmits it to the RLP resequencing queue 112. The RLP resequencing queue orients the data in logical sequence and transmits it through chat server 113 to RLP input buffer 114. Input buffer 114 then drives RLP transmitter 115 to transmit the data via the listener air link 116 to mobile 12.

The listener air link 116 couples base station 11 to mobile 12. The data transmitted via the listener air link 116 is received by RLP code 121. The data is then logically oriented by RLP resequencing queue 122. The data is then transmitted to a vocoder input buffer 123 and finally is converted to voice by vocoder 124 and transmitted to the listener associated with mobile 12.

Both mobiles 10 and 12 include battery level detectors. Mobile 10 includes battery level detector 125 which is coupled to RLP transmitter 103 and transmits an indication of the battery level for mobile 10. Similarly, mobile 12 includes a battery level detector 126 and when mobile 12 is in a transmission mode, battery level detector 126 transmits an indication of the battery level to base station 11.

Figure 2:
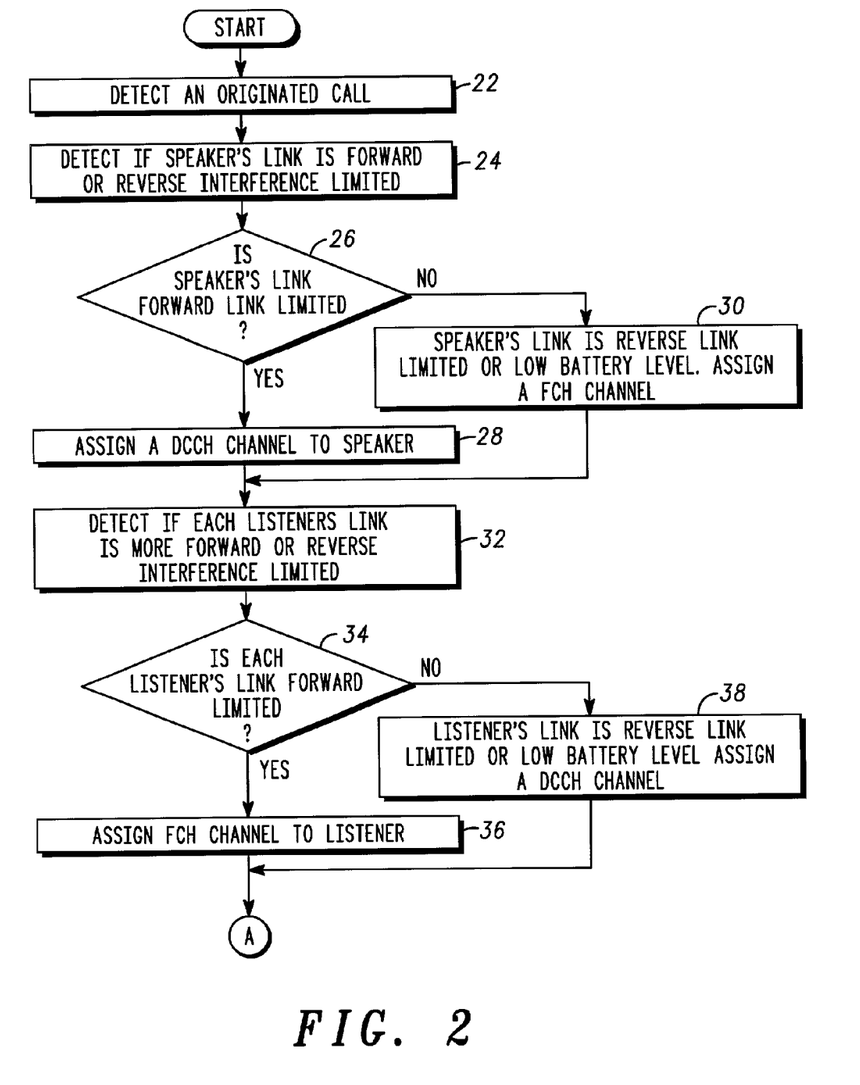
FIGS. 2 and 3 are a flow chart of a detection of a dispatch call origination in accordance with the present invention.
Figure 3:
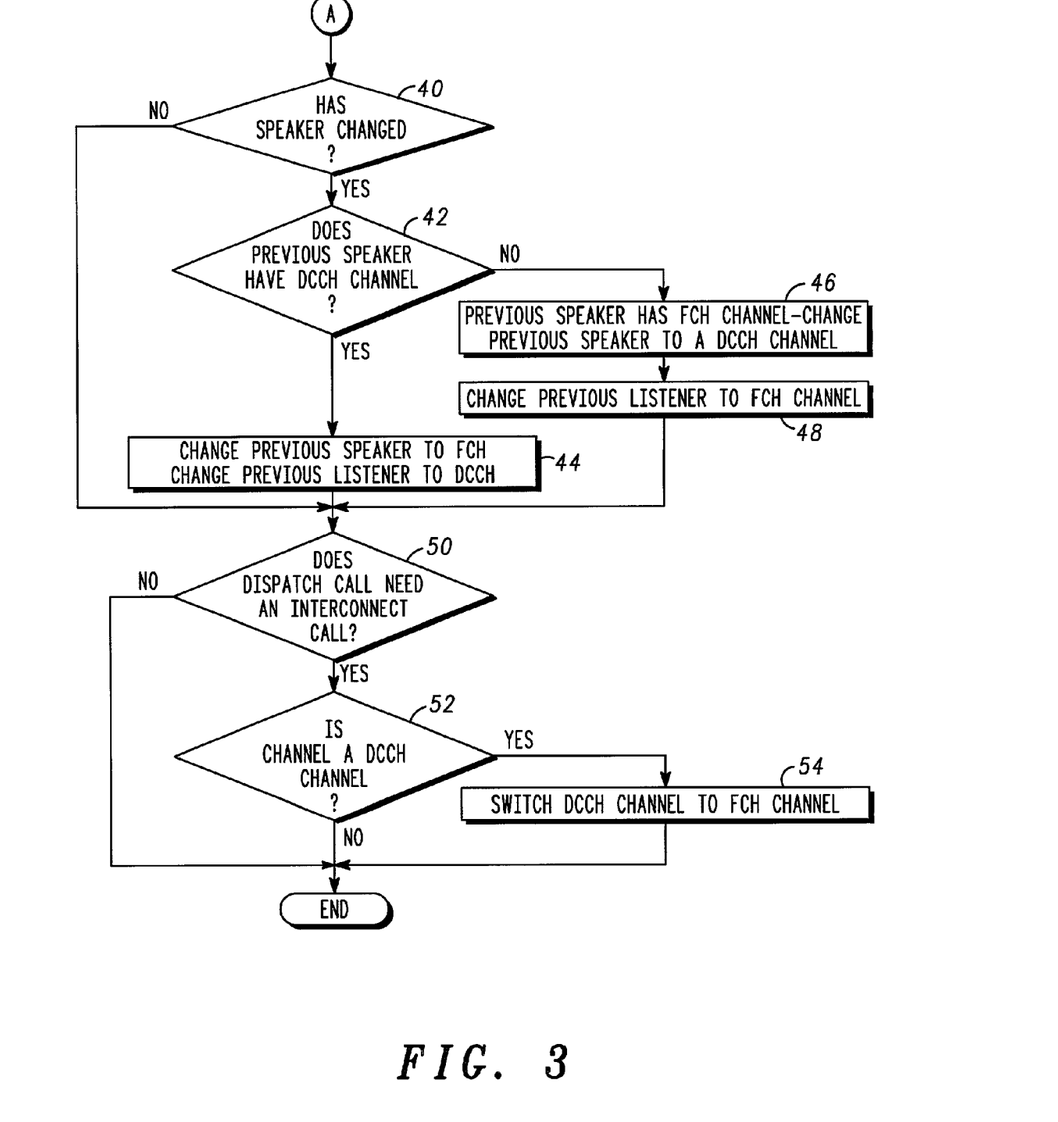

FIGS. 2 and 3 depict an origination of a dispatch call. A dispatch call origination is detected by the base station, block 22. Next, the base station detects whether the speaker's air link 104 is more forward or reverse interference limited. That is, whether the transmitting or receiving link of mobile 10 or example, is more limited, block 24. Next, block 26 determines whether the speaker's forward link (up link with respect to the base station) is interference limited. If the speaker's forward link is interference limited, the base station 12 assigns a DCCH channel to the speaker, block 28.

If the speaker's forward link is not limited, the speaker's reverse link is more limited or if the battery level detector 125 for example, has detected a low battery level. In that case, the reverse link is limited and the base station assigns a FCH channel to the speaker, block 30.

Next, block 32 detects whether each listener's link is more forward or reverse interference limited. If a listener's forward link is link limited, block 34 transfers control to block 36 via the YES path. Block 36 assigns a FCH channel to the listener's forward link. If the listener's forward link is not link limited, block 34 transfers control to block 38 via the NO path. Block 38 determines that the listener's link is reverse link limited and assigns a call a DCCH channel.

Next, it is determined whether the speaker has changed. If the speaker has changed, block 40 transfers control to block 42. If the speaker has not changed, control is transferred to block 50 and the method is continued. If the speaker has changed, block 40 transfers control to block 42 via the YES path.

Block 42 determines whether the previous speaker had been assigned a DCCH channel. If the previous speaker had been assigned a DCCH channel, block 42 transfers control to block 44 via the YES path. Block 44 changes the previous speaker's channel to an FCH channel and changes the previous listener's channel to a DCCH channel. The process then continues with block 50.

If the previous speaker did not have a DCCH channel, block 42 transfers control to block 46 via the NO path. Block 46 changes the previous speaker's channel to a DCCH channel. Then, block 48 changes the previous listener's channel to a FCH channel and continues the process at block 50.

Block 50 determines whether an existing dispatch call (data) needs to make an interconnect call (voice call). That is, whether a data transmission call needs to make a basic voice call. If an interactive call is requested, block 50 transfers control to block 52 via the YES path. Block 52 determines whether the existing channel is a DCCH channel. If the channel is a DCCH channel, then the DCCH channel is switched to a FCH channel, block 54. The switch from the DCCH channel to the FCH channel occurs with a single message from the switching network. The switching is performed by the network without tearing down the existing traffic channel which implies a lower delay. The process is then ended. If the channel is not a DCCH channel, then a FCH channel is already in use and block 52 simply ends the process via the NO path.

Figure 4:
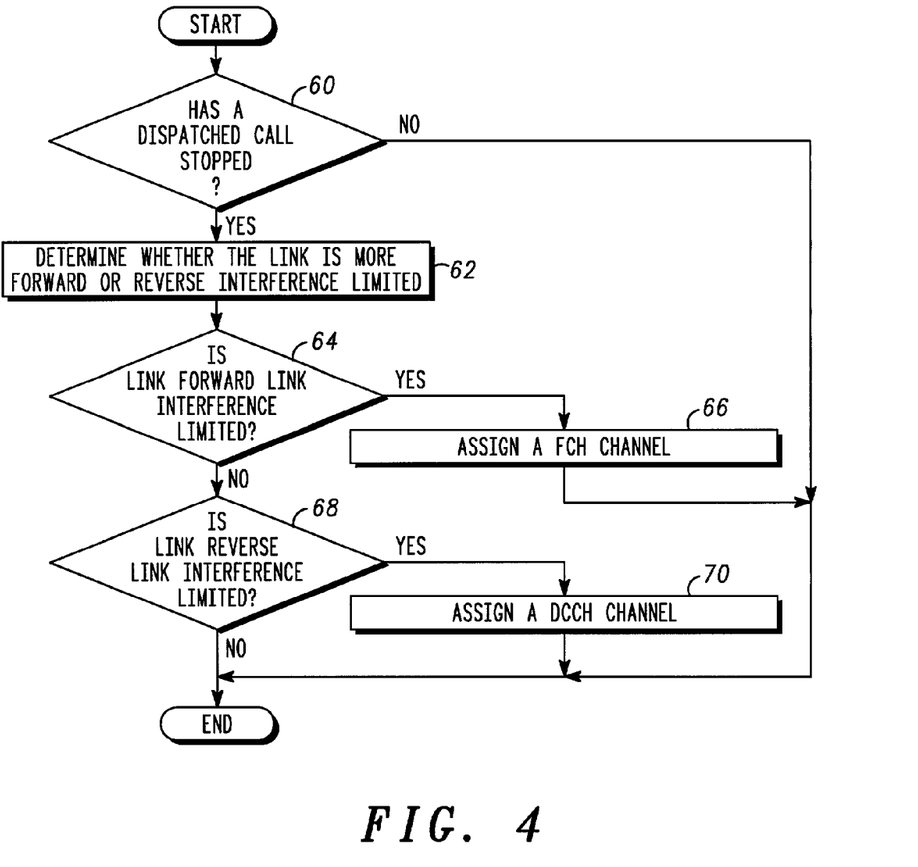
FIG. 4 is a flow chart of a dispatch call that has stopped transmitting in accordance with the present invention.

If the call is not a dispatch call requesting an interconnect call, block 50 transfers control via the NO path to end the process. FIG. 4 depicts a dispatch call that has stopped, that is, a speaker has released the push to talk button of the mobile 10, for example. It is determined whether a dispatch call has stopped by block 60. If the dispatch call has stopped, block 60 transfers control to block 62 via the NO path. Block 62 determines whether the link is more forward or reverse interference limited. If the link is forward link interference limited, block 64 transfers control to block 66 via the YES path. Block 66 assigns the link a FCH channel and ends the process.

If the link is not forward link interference limited, block 64 transfers control to block 68 via the NO path. Block 68 determines whether the link is reverse link interference limited. If the link is reverse link interference limited, block 68 transfers control to block 70 via the YES path. Block 70 assigns the reverse link a DCCH channel and ends the process. If block 68 has not detected that the reverse link is interference limited, control is transferred and the process is ended.

Figure 5:
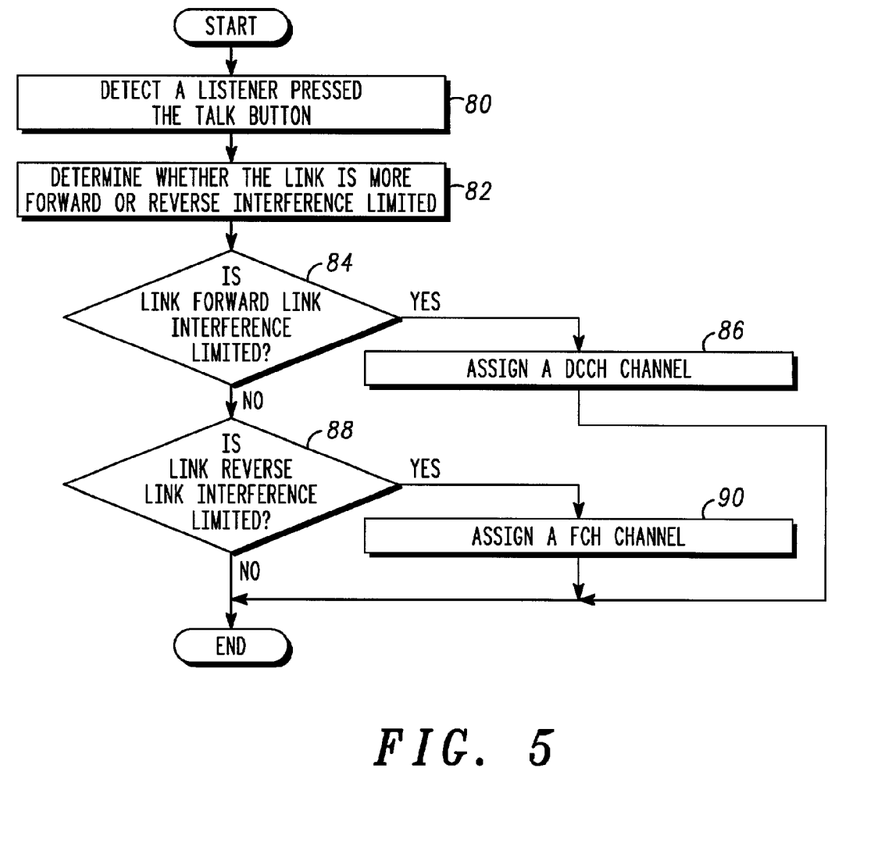
FIG. 5 is a flow chart of a dispatch call in which the listener has requested to become the speaker in accordance with the present invention.

FIG. 5 depicts the procedure for a listener who presses the talk button and is subsequently granted by the system the ability to speak. Block 80 detects that a listener has pressed the talk button and is granted the permission by the system to talk. Block 82 determines whether the link is more forward or reverse interference limited.

If the link is more forward link interference limited, block 84 transfers control via the YES path to block 86. Block 86 assigns the forward link a DCCH channel and ends the process. If the link was not forward link interference limited block 84 transfers control to block 88 via the NO path. Block 88 determines whether the link is reverse interference limited. If it is, control is transferred from block 88 to block 90.

Block 90 assigns a FCH channel to the link and ends the process. If the reverse link is not interference limited, block 88 simply ends the process.

Figure 6:
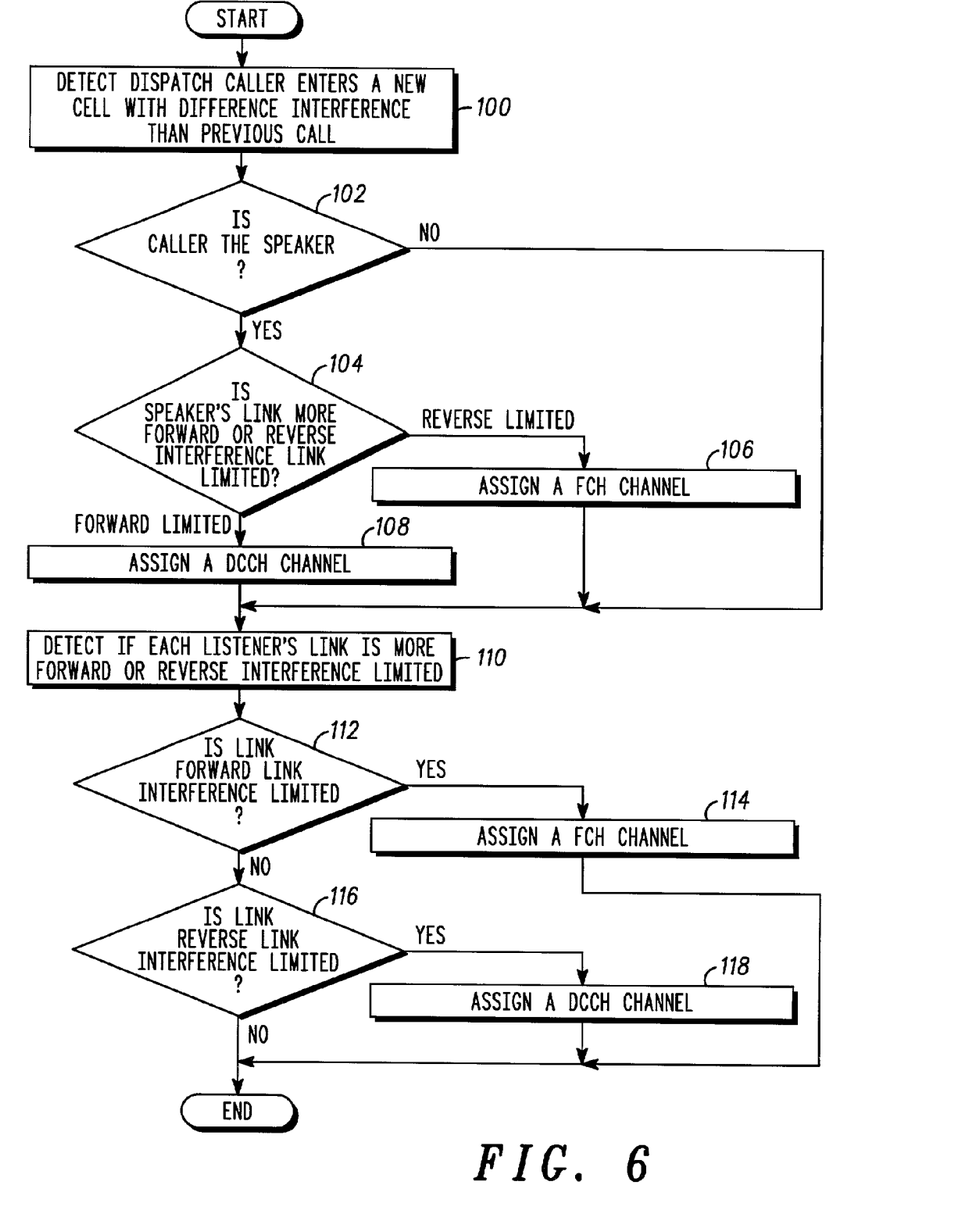
FIG. 6 is a flow chart of a dispatch call that roams from one cell to another cell in accordance with the present invention.

FIG. 6 depicts a flow chart of a dispatch call which moves from one cell to another. When a dispatch caller moves to a new cell, a detection is made by the base station of any differences in the interference to the caller from the previous cell in which the caller was located, block 100.

Block 102 determines whether the caller is not the speaker, control is transferred to block 110. If the caller is the speaker, block 102 transfers control to block 104 via the YES path. Block 104 determines whether the speaker's link is more forward or reverse interference link limited. If the speaker's link is more reverse link limited, the reverse link is assigned an FCH channel, block 106. Control is then transferred to block 110. If the speaker's link is more forward link limited, block 108 assigns a DCCH channel to the speaker's forward link and transfers control to block 110.

Block 110 detects whether each listener's link is more forward or reverse interference limited. If each listeners link is more forward link interference limited, block 112 transfers control to block 114 via the YES path. Block 114 assigns a FCH channel to the listener's forward link and ends the process. If the link is not more forward link interference limited, block 112 transfers control to block 116 via the NO path.

Block 116 determines whether the reverse link is interference link limited. If it is, block 116 transfers control to block 116 via the YES path. Block 118 assigns a DCCH channel to the listener's reverse link and ends the process. If the reverse link is not more interference link limited, the process is simply ended by block 116.

Figure 7:
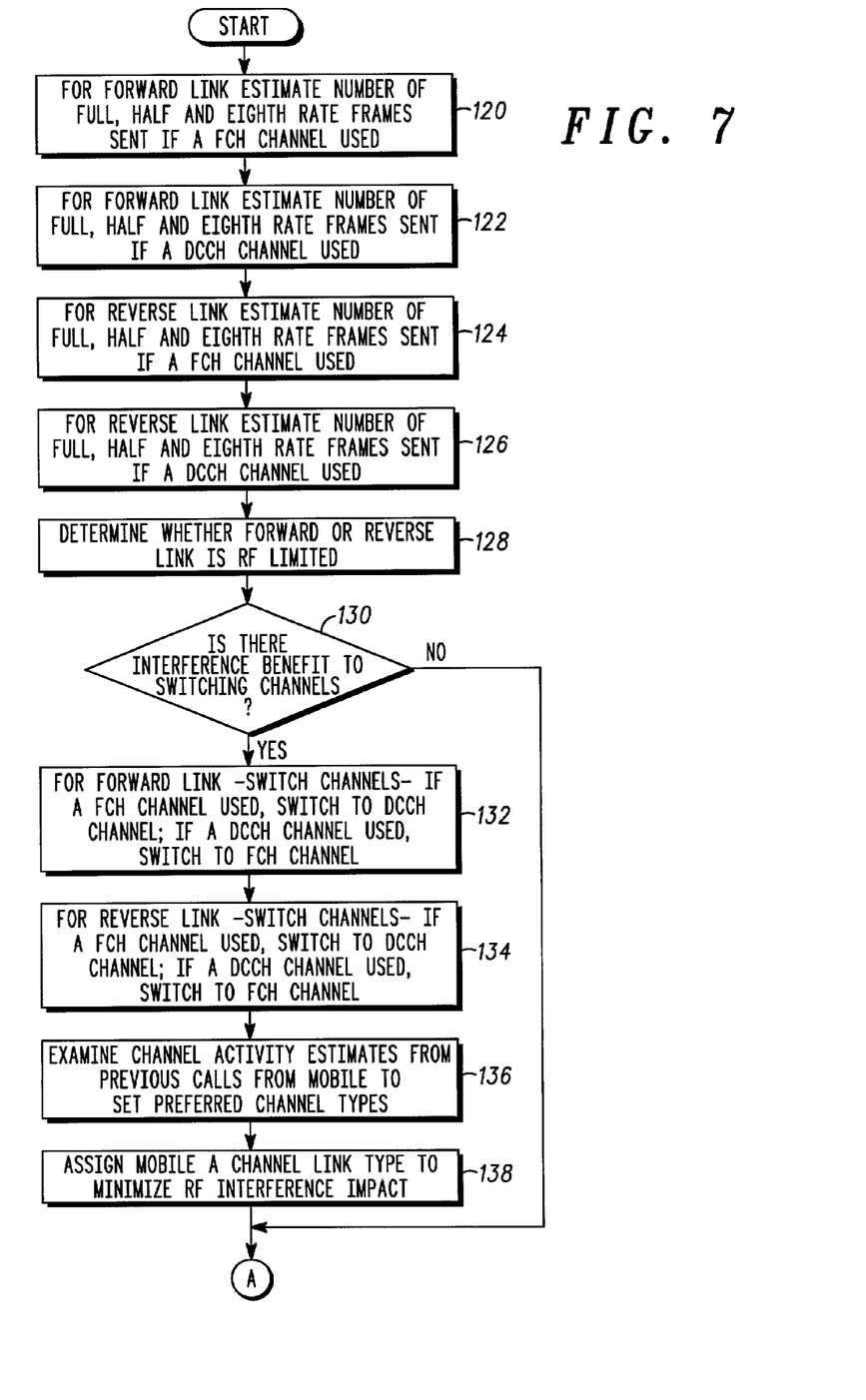
FIGS. 7 and 8 are a flow chart of a voice call (non-dispatch call) in accordance with the present invention.
Figure 8:
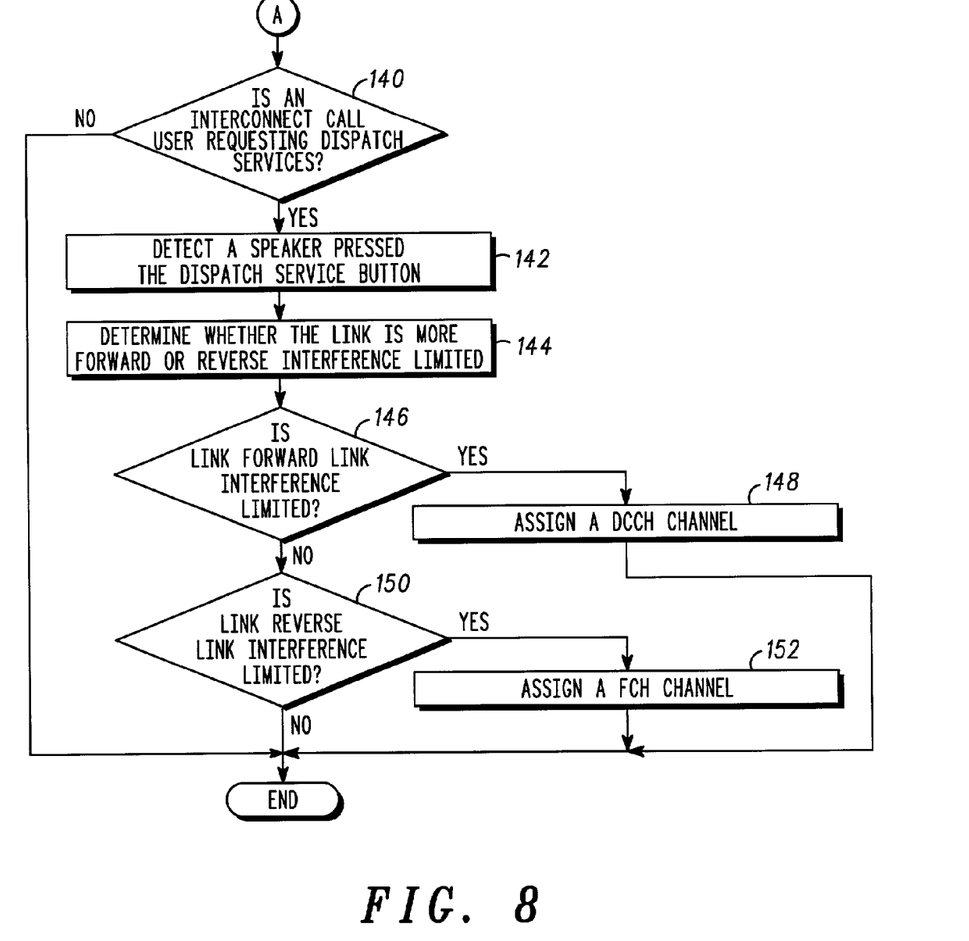

FIGS. 7 and 8 depict a flow chart of a non-dispatch call, voice call, processed by the arrangement describing the present invention. Traffic is observed over the forward link by block 120 which estimates the number of full, half and eighth rate frames that would have been sent over the link if a FCH channel was used. Next, for the forward link, an estimate of the number of full, half and eighth rate frames that would have been sent over the link if a DCCH channel was used, is made by block 122.

For the reverse link, an estimate is made of the number of full, half and eighth rate frames that would have been sent over the link if a FCH channel was used, block 124. Then, for the reverse link an estimate is made of the number of full, half and eighth rate frames that would have been sent over the reverse link if a FCH channel was used, block 126.

Next, a determination is made whether the forward or reverse link is RF interference limited, block 128. Block 130 determines whether there is any benefit to be obtained over RF interference by switching channels. If not, block 130 continues the process at block 140.

If there is benefit to be obtained by minimizing the RF interference over the links to the mobile, block 130 transfers control to block 132 via the YES path. Block 132 switches the channels of the forward link. That is, if the forward link was using a FCH channel, a switch is made to a DCCH channel; or if a DCCH channel was used for the forward link, the base station switches the channel to a FCH channel.

Similarly, for the reverse link, the channels are switched by block 134. If a FCH channel was used for the reverse link, the base station switches the channel to a DCCH channel; or if a DCCH channel was used for the reverse link, the base station switches the reverse channel to a FCH channel.

Next, block 136 examines the historical channel activity using the estimates for FCH and DCCH made above in steps 120 through 126, to determine whether there is a preferred channel type indicated by previous calls to or from that particular mobile to determine what channel type to assign. There may be no previous history with this mobile or insufficient data in which case the channel type will be left as previously set in steps 132 and 134.

Lastly, block 138 insures that the channel type assigned to the mobile minimizes the RF impact, that is, the total number of bits sent without error per minute. Then the process is then continued at block 140.

Block 140 determines whether the call is an interconnect (voice) call that is requesting a dispatch (data) call service. If not, block 140 simply ends the process via the NO path. If so, block 140 transfers control to block 142. Block 142 detects that a speaker has pressed the dispatch service button and is granted the permission by the system. Block 144 determines whether the link is more forward or reverse interference limited.

If the link is more forward link interference limited, block 146 transfers control via the YES path to block 148. Block 148 assigns the forward link a DCCH channel and ends the process. If the link was not forward link interference limited block 146 transfers control to block 150 via the NO path. Block 150 determines whether the link is reverse interference limited. If it is, control is transferred from block 150 to block 152. Block 152 assigns a FCH channel to the link and ends the process. If the reverse link is not interference limited, block 150 simply ends the process.

Historically, is IS-95 CDMA systems, these systems were generally forward link limited when loaded with symmetric traffic. In data calls roughly 80% of the bits are sent over the forward link. This would tend to force systems to be forward link limited. As dispatch services become significant system services then it is also possible that cells in the cell system would become reverse link limited if a large number of mobiles were speaking at the same time. With dynamic FCH/DCCH channel switching as embodied in the present invention, problems of forward and reverse link limitations are minimized while the CDMA system provides a relatively high quality of service.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a code division multiple access (CDMA) system for providing dispatch call service, a method for dynamic channel switching between mobile units, the method for dynamic channel switching comprising the steps of:
   if a forward link of a speaker is interference limited, assigning by a base station a DCCH channel to the forward link;
   if the reverse link of the speaker is interference limited, assigning by the base station a FCH channel to the reverse link;
   if a forward link of a listener is interference limited, assigning by the base station a FCH channel to the forward link;
   if the reverse link of the listener is interference limited, assigning by the base station a DCCH channel to the reverse link;
   for a change of the speaker:
   switching DCCH channels to FCH channels; and
   switching FCH channels to DCCH channels.

2. In a CDMA system the method for dynamic channel switching as claimed in claim 1, wherein there is further included the step of:
   if a mobile unit of the speaker indicates a low battery level, assigning the reverse link of the speaker a FCH channel.

3. In a CDMA system the method for dynamic channel switching as claimed in claim 1, wherein there is further included the step of:
   if the mobile unit of the listener indicates a low battery level assigning the reverse link of the listener a DCCH channel.

4. In a CDMA system the method for dynamic channel switching as claimed in claim 1, wherein there is further included the step of:
   determining whether the dispatch call service requires interconnect call service; and
   if so, switching the DCCH channel to a FCH channel.

5. In a CDMA system the method for dynamic channel switching as claimed in claim 4, wherein there is further included the steps of:
   determining whether the assigned channel is a DCCH channel; and
   if so, switching the DCCH channel to a FCH channel.

6. In a CDMA system for providing dispatch call service, a method for dynamic channel switching, the method including the step of:
   determining that a speaker in a dispatch call has stopped speaking;
   if the speaker has stopped speaking:
      determine whether the speaker's communication link is more forward or reverse link interference limited;
      if a forward link of the speaker is more interference limited, assigning the forward link a DCCH channel; and
      if a reverse link of the speaker is more interference limited, assigning the reverse link a FCH channel.

7. In a CDMA system for providing dispatch call service, a method for dynamic channel switching, the method including the step of:
   detecting that a listener has pressed a talk button of a subscriber unit;
   if the listener has pressed the talk button:
      determining whether a communication link is more forward or reverse interference limited;
      if a forward link of the listener is more interference limited, assigning a DCCH channel to the forward link; and
      if a reverse link of the listener is more interference limited, assigning a FCH channel to the reverse link.

8. In a code division multiple access (CDMA) system for providing interconnect call service, a method for dynamic channel switching, comprising the step of:
   estimating a number of frames sent for a plurality of frame rates for a first channel type, wherein the step of estimating for a first channel type includes the steps of:
      estimating a number of full, half and eighth rate frames which would be sent for a FCH channel;
      estimating a number of rate frames for a full, half and eighth rate frames which would be sent for a DCCH channel;
   estimating the number of frames sent for a plurality of frame rates for a second channel type;
   for a first link type;
      switching the first channel type to the second channel type;

switching the second channel type to the first channel type;
for a second link type;
switching the first channel type to the second channel type; and switching the second channel type to the first channel type.

9. In a code division multiple access (CDMA) system for providing interconnect call service, a method for dynamic channel switching, comprising the step of:
estimating a number of frames sent for a plurality of frame rates for a first channel type;
estimating the number of frames sent for a plurality of frame rates for a second channel type, wherein the step of estimating for a second channel type includes the steps of:
for a reverse link, estimating a number of rate frames for full, half and eighth rate frames which would be sent for a FCH channel;
for a reverse link, estimating a number of rate frames for a full, half and eighth rate frames which would be sent for a DCCH channel;
for a first link type;
switching the first channel type to the second channel type;
switching the second channel type to the first channel type; for a second link type:
switching the first channel type to the second channel type; and switching the second channel type to the first channel type.

10. In a code division multiple access (CDMA) system for providing interconnect call service, a method for dynamic channel switching, comprising the step of:
estimating a number of frames sent for a plurality of frame rates for a first channel type;
estimating the number of frames sent for a plurality of frame rates for a second channel type;
for a first link type:
switching the first channel type to the second channel type;
switching the second channel type to the first channel type;
for a second link type:
switching the first channel type to the second channel type; switching the second channel type to the first channel type;
determining whether a forward or reverse link is more RF limited; and
if there is RF interference benefit, performing said steps of switching the first channel type and switching the second channel type.

11. In a code division multiple access (CDMA) system for providing interconnect call service, a method for dynamic channel switching, comprising the step of:
estimating a number of frames sent for a plurality of frame rates for a first channel type, wherein said first channel type is a forward link, and wherein said first channel type is a FCH channel;
estimating the number of frames sent for a plurality of frame rates for a second channel type, wherein said second channel type is a reverse link, and wherein said second channel type is a DCCH channel;
for a first link type:
switching the first channel type to the second channel type;
switching the second channel type to the first channel type;
for second link type:
switching the first channel type to the second channel type; and switching the second channel type to the first channel type.

12. In a code division multiple access (CDMA) system for providing interconnect call service, a method for dynamic channel switching, comprising the step of:
estimating a number of frames sent for a plurality of frame rates for a first channel type;
estimating the number of frames sent for a plurality of frame rates for a second channel type;
for a first link type:
switching the first channel type to the second channel type;
switching the second channel type to the first channel type;
for a second link type:
switching the first channel type to the second channel type; switching the second channel type to the first channel type;
examining channel activity estimates from previous calls from a mobile unit;
based on the step of examining, setting a preferred channel type; and
assigning the mobile unit a channel type to minimize RF interference.

* * * * *